UNITED STATES PATENT OFFICE.

IRVEN H. DEXTER, OF PEARL RIVER, NEW YORK, ASSIGNOR TO I. H. DEXTER COMPANY, INC., A CORPORATION OF NEW YORK.

CLUTCH.

1,321,607. Specification of Letters Patent. Patented Nov. 11, 1919.

Application filed August 13, 1915. Serial No. 45,303.

*To all whom it may concern:*

Be it known that I, IRVEN H. DEXTER, a citizen of the United States, and a resident of Pearl River, county of Rockland, and State of New York, have made certain new and useful Improvements in Clutches, of which the following is a specification.

This invention relates principally to clutches that are used in connection with the shafting of machines which it is intended to work only during a predetermined number of revolutions.

Primarily, the invention has for its object to provide means for securely holding the driving and driven members of the clutch apart during such periods of time when the machine should remain inactive, the said means being designed so as to develop a progressively increasing resistance that must be removed before the clutch can be applied, and thereby affording a safeguard against accidental starting of the machine.

Another object is the provision of a controlling mechanism which shall be strictly automatic in character, both as regards the engagement and the parting of the clutch members, the mechanism requiring but the momentary removal or displacement of the resistance aforesaid to enable it automatically to go through and perform its entire cycle of operations.

A further object is the production of a mechanism whereby the clutch can be operated positively through the force of gravitation, as well as yieldingly by resilient means, or with both elastic and gravitating instrumentalities combined.

Other objects and advantages will be readily discerned in the following statement of the various structural features of the invention.

The invention consists in the novel parts, improvements, combinations, and features of construction herein shown and described.

In the accompanying drawings, which are referred to herein and form part hereof, is illustrated an embodiment of the invention, the same serving in connection with the description herein to explain the principles of the invention.

Figure 1:
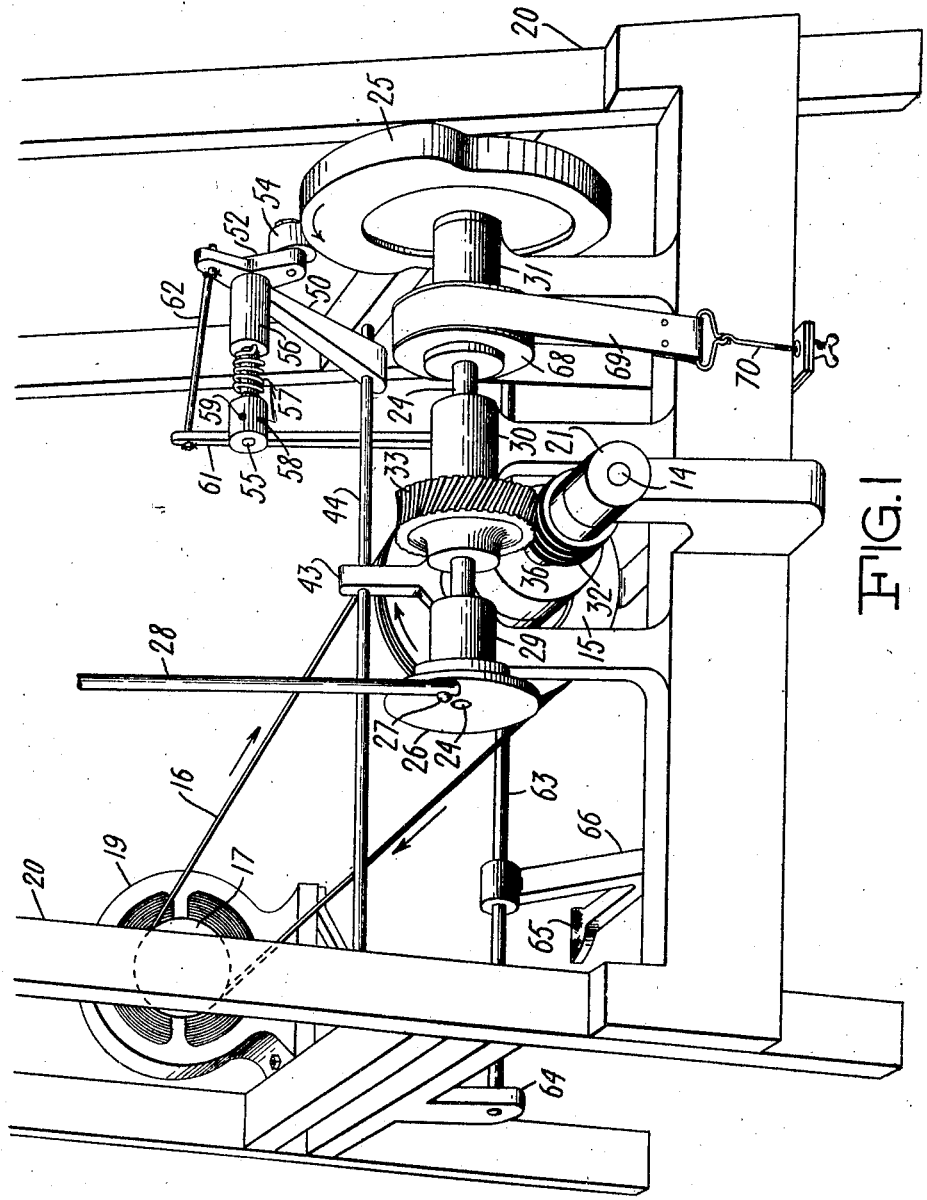
Figure 1 is a perspective view of one form of mechanism made in accordance with the invention.

A clutch constructed in accordance with one feature of the invention comprises in combination, a pair of clutch members designed to be brought together, and means adapted to effect the engagement of said members by gravitation.

In one embodiment of this feature of the invention said means comprises a gravitating actuator adapted to shift one of said clutch members toward the other.

In accordance with other features of the invention, a movable abutment is provided to check the action of said actuator, and a starter is provided for displacing said actuator.

These and other features of the invention will be more fully described and set forth in the following description.

Referring now in detail to the drawings, the clutch included in this improved mechanism may be of the well-known disk type, comprising a driving member 11 and a driven member 12, facing each other and adapted to turn together by frictional engagement, a ring or gasket 13, of leather or equivalent material, being interposed between the members to insure a better contact. As shown, these members are mounted on a common shaft 14, the member 11 being loose thereon, and the member 12 having a spline connection, indicated at 15, enabling it to rotate the shaft when the said members become engaged. Motion is imparted to the disk or clutch member 11, and through the latter to the other disk or clutch member 12 and to their said shaft 14, by a belt 16, engaging with a pulley 17, on the armature shaft 18, of an electric motor 19, supported as shown, within a frame 20. The shaft 14 has its bearings 21, 22, carried preferably by the same frame.

Power may be transmitted directly or indirectly, as desired, from the shaft 14, to the working element or operating part of a machine equipped with the clutch controlling mechanism herein disclosed. In pursuance of the aims of the present invention, however, it is deemed preferable to employ in connection therewith an intermediate shaft 24, and gearing presently to be described. A cam 25, fixed upon one end of this shaft, largely governs its movements, and therefore the latter will be referred to hereinafter as a cam-shaft, to distinguish it from the other shafting included in the mechanism. At its other end, the said cam-shaft 24 carries a crank-wheel 26, having a wrist pin 27, to which is attached a pitman 28, connecting with the implement or machine part intended to receive the power transmitted. Bearings 29, 30 and 31, supported on the frame 20, hold the cam-shaft, preferably, at substantially right angles to the shaft 14, in convenient position to apply the said gearing.

Preferably and as shown, the gearing above mentioned is composed merely of a worm 32, fastened to the shaft 14, and a worm-wheel 33, in mesh therewith, similarly secured to the cam-shaft 24. Worm-gearing is thus selected to communicate motion from one of these shafts to the other, partly on account of its simple and effective character, and partly because of the inherent tendency of its component members to interlock so as to prevent back rotation.

Figure 3:
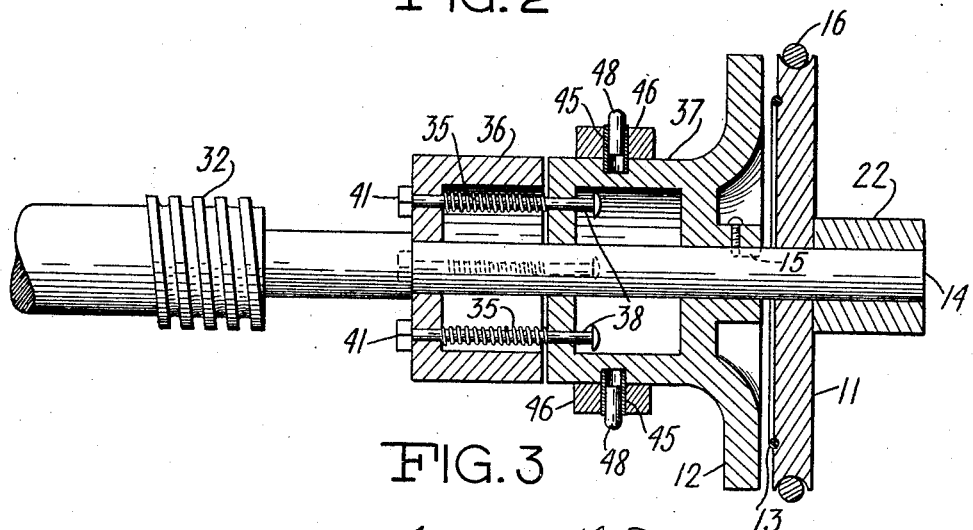
Fig. 3 is a sectional plan of the clutch members and parts most closely connected therewith.

In the embodiment of the invention illustrated, yielding means are provided to urge the clutch member 12 into engagement with its companion member 11, and they may consist, as shown in Fig. 3, of a set of spiral springs 35, confined within a collar 36, which is secured to the shaft 14, in rear of a spool-like extension 37 of the said member 12, at a sufficient distance to enable the latter and its said spool extension to slide with the spline 15 to and from the said member 11. The several springs 35 are coiled around bolts 38, joining the spool 37 slidably with the collar 36, the said bolts being preferably passed through alined apertures in the bearing parts of the said spool and collar, respectively, and having their heads inside the spool, while their threaded ends are brought outside the collar and carry retaining nuts 41, all as detailed in said Fig. 3. The rear end of the spool, it will be seen, operates to compress the springs, when the clutch member 12 is drawn away or recedes from the clutch member 11. Light springs only need be employed, as they are utilized more as a precautionary expedient than as a measure of necessity, considering that the other operative parts of the device, next to be described, are so constructed and arranged as to effect the working of the clutch without the use of such springs.

In the preferred form of the invention, retraction of the clutch member 12 from the clutch member 11 is accomplished, as also the incidental compression of the spiral springs 35 abutting against the spool 37, by means of a fork or bifurcated lever 43, depending from a shaft 44, journaled in the frame 20, in substantial parallelism with the cam-shaft 24. This fork or lever also serves to work the clutch positively, irrespective of the compression springs, as will appear hereinafter. As shown, the fork 43 is formed to straddle the spool 37 and is pivotally connected therewith through the medium of nipples 45, projecting inwardly from its tines 46 and slidably engaging a groove 47, formed annularly across the peripheral surface of the said spool. An inverted spring bail 48, having its ends inserted in the outer extremities of the nipples 45, maintains the inner ends of the latter inside the groove 47 while the shaft 14 and the spool 37 revolve within the fork 43.

The said shaft 44 is subject to the action of a relatively fixed arm 50, projected upwardly therefrom in a rearward direction in proximity to the aforementioned cam 25. This arm has sufficient weight and lateral incline to enable it to rotate the shaft 44, and consequently to swing with it the fork 43, thereby sliding the spool 37 and the clutch member 12 forward, independently of the springs 35, into engagement with the clutch member 11. Thus, through the agency of the arm 50, the clutch is operated by gravity, as well as by spring action. Further reference to said arm will presently be made.

Figure 2:
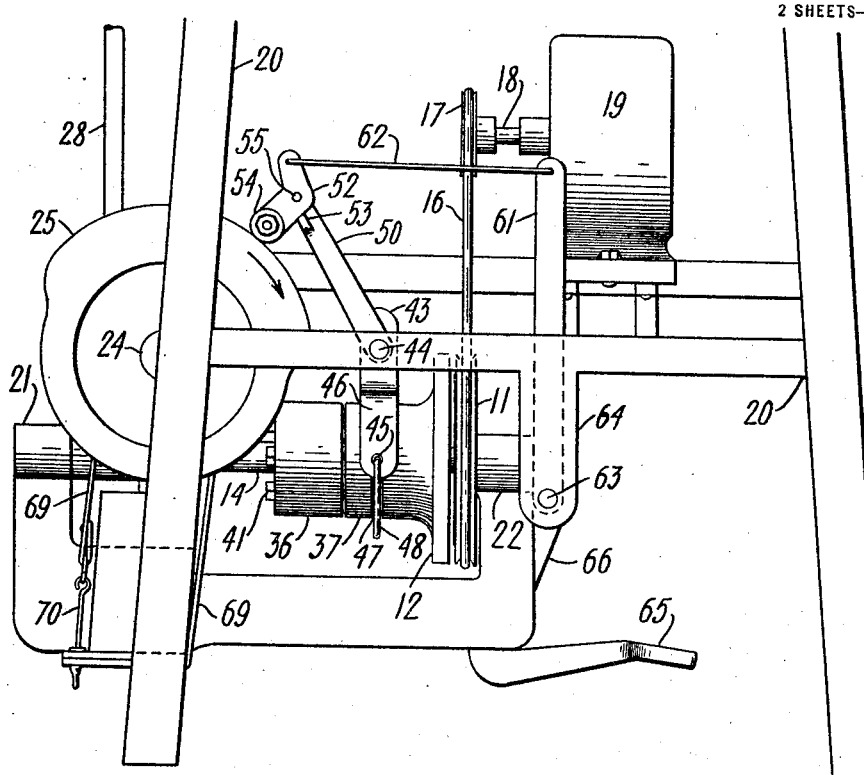
Fig. 2 is a side elevation of the same.

In order to disengage the members 11 and 12 and render the clutch inactive, the arm 50 is slightly raised by means of a bell-crank lever 52, arranged to bear against a stop 53, see Fig. 2, on the upper part of the arm, said lever being acted upon by the cam 25, preferably through an interposed roller 54. The bell-crank or angular lever 52 is fulcrumed at its angle upon a stud or pivot-pin 55, fastened thereto at one end and thence passing inwardly through a bearing 56, carried by the arm 50. The said stud or pin 55 acts as an axis and is extended beyond its bearing 56 a sufficient distance to receive a coiled-spring 57, and a collar 58, held by a set-screw 59. The spring 57 is attached at its ends to opposite sides of the bearing and collar, respectively, and is wound about the stud therebetween with enough tension normally to maintain the roller-carrying arm of the bell-crank lever in contact with the stop 53 on the gravitating arm 50. The stop prevents the roller and the part of the bell-crank provided with the same from passing too far below the center line of the axis 55 and cam-shaft 24, in any position of the cam 25, and when the high or operative portion of the cam meets the roller, it forces the connected bell-crank arm against the said stop and causes the latter-named arm to assume a position at an acute angle relatively to the line joining the centers of the axis 55 and of the shaft 44, that is, the median line of the gravitating arm 50. When thus positioned, the arm 50 has been elevated to a sufficient extent to disengage the clutch members, and produces the required friction upon the cam to check its rotation, together with that of the shafting and gearing connected therewith.

To apply the clutch, it is only necessary to rock the bell-crank lever 52 upon its axis 55, which causes the roller 54 to clear the raised surface of the cam 25 and liberates the gravitating arm 50. The rocking is effected most conveniently by means of a vertically-disposed lever 61, connected at its upper end by a rod or link 62, with the forward arm of the bell-crank, and rigidly secured at its lower end to a shaft 63, journaled in hangers 64, depending from the frame 20. The last-named shaft may be rotated through any suitable instrumentality capable of filling the function of a starter for the mechanism and responsive preferably to an impulse of the hand or foot of the operator, as desired. In the present case, the shaft 63 is shown as being operable simply with the aid of a treadle or pedal 65, rigidly secured thereto by a rearwardly-bent shank 66.

The resistance created by the cam 25, roller 54 and coacting agencies, is well suited in ordinary conditions to arrest the mechanical elements set in motion by the clutch, that is, when the members thereof are being parted, but as a further precaution, a brake drum 68 is keyed to the shaft 24, adjacent to the bearing 31, and a leather band 69, passed over the said drum, is adjusted thereon so as to produce the additional friction which may be needed to stop the shaft at some predetermined moment. The friction between the drum and the band may be increased or decreased by any suitable means; for example, by the screw form of tightener shown at 70, in Figs. 1 and 2.

In practice, the form of mechanism herein described operates as follows:

The proper connection having been made between the pitman 28 and the working element or machinery to be actuated thereby, and the electric current having been turned into the motor 19 to rotate the disk 11, the operator places his foot on the pedal 65 and depresses it as far as it will go. The downward movement of the pedal causes the shaft 63 to turn and swings forward the lever 61, which pulls the rod 62 and rocks the bell-crank 52. The latter lifts the roller 54 off the surface of the cam 25, and at the same time tightens the coiled-spring 57 around the stud 55 sufficiently to return in due course the bell-crank and roller to their respective positions. The resistance between the cam, the roller, the bell-crank, and the stop 53 being now removed, the arm 50 gravitates rearwardly and drives the disk 12 forwardly into engagement with the disk 11, by turning the shaft 44 and the fork 43, and sliding the spool 37. When properly proportioned or weighted, the arm 50 is capable of achieving this result without the assistance of the springs 35, being then practically the sole actuator or shifter of the clutch, with the interconnecting instrumentalities. The springs 35 are merely auxiliary in the present form of the invention, though it is clear that they too can be made to work the clutch of themselves, that is, unaided by the arm 50, if it lacked the necessary strength and power of gravity. It is understood that the disks 11 and 12, being clutched together, rotate the shafts 14 and 24, with the interposed gearing, and transmit the movement of the crank-wheel 26 and pitman 28.

The cam revolves with the shaft 24, and is timed to make a number of revolutions equal to that of the crank-wheel, which number may vary according to the nature of the work to be performed by the tool or machine actuated by the pitman. The drawings hereto attached show a cam designed to make just one complete turn before it is brought to a stop, as required, for instance, when this controlling mechanism is used in connection with a paper-cutting machine. The high portion of the cam runs past the roller 54 when the lower arm of the bell-crank is tilted up, and before the tensioned spring 57 is able to force this lower arm back against the stop 53. The stop and bell-crank again become engaged when the low portion of the cam passes opposite the roller, but the latter-named portion of the cam, though the roller be riding on it, is incapable of raising the arm 50. It is only when the forward end of the high portion of the cam encounters the roller that it forces the lower arm of the bell-crank against the stop 53 with the degree of force requisite to raise the gravitating arm, which separates the clutch members by turning the shaft 44 and fork 43 backward and simultaneously sliding the spool 37 rearwardly toward or against the collar 36, the latter then acting as a buffer. The springs 35, if used, are compressed in the manner indicated in Fig. 3, ready to apply, or help to apply, the clutch anew when again released, and meanwhile they prevent any injurious impact of the spool against the collar or buffer 36, which is thus made resilient. Of course, the collar alone would suffice to limit the movement of the spool 37 rearward, and also the swinging of the arm 50 forward, even if the compression springs were absent, the rotation of the shaft 44 and fork 43 backward being accordingly checked by a springless buffer, but the employment of a yielding buffer is preferred.

Any movement of the fork and shaft thereof forward, that is, in the direction of the clutch members, is precluded as long as the roller is caused to impinge directly against the high part of the cam. This part of the cam, it will be noticed, is made of sufficient length to allow the momentum to dissipate itself when the rotation of the cam is arrested. It is long enough also to avoid lowering the bell-crank to such an extent as would free the gravitating arm and clutch. When the cam has been arrested substantially in the position shown, its pressure and action against the arm 50, through the associated roller, bell-crank, and stop thereto appertaining, operates to keep the disks 11 and 12 fully apart, and nothing can bring them together again, except the depression of the treadle. Otherwise stated, the associated parts here referred to form an abutment against the cam which only the working of the treadle can remove. The pedal 65 and its shank 66, it will be noticed, are so shaped, and the weight thereof so distributed with relation to the axis or center line of the shaft 63, that the latter tends to rock backward and consequently helps to maintain the lever 61 upright, causing it to keep the upper arm of the bell-crank elevated, and opposing the application of the clutch unless and until the pedal is forcibly depressed.

Although only a simple discoidal clutch has been shown and described herein, it will be understood that the invention is applicable to all kinds of friction clutches, especially when used with machines that are to work a given number of revolutions. As before stated, the present embodiment of the invention is suitable for a paper-cutting machine, in which it is very essential to have the mechanism stop after one complete revolution, and in such shape that it can not be started again unless the operator deliberately sets it in motion. It should further be understood that, while the preferred form of the invention has been set forth in detail, various modifications and changes in certain features thereof may be resorted to successfully to carry the invention into practice, without sacrificing any of its chief advantages or departing from the scope of the claims hereto appended.

I claim:

1. A controlling mechanism of the class described including, in combination, members designed to be clutched together, an operating shaft arranged to be driven thereby, and a brake adapted alternately to effect the engagement of said members through gravitation toward said shaft and to arrest the latter upon retrogression.

2. The combination of clutch members adapted for interengagement, a shaft arranged so as to be rotated by the engaged members, a gravitating shifter serving while depressed at its upper end to unite the latter, and braking means for said shaft operating to hold said end of the shifter temporarily elevated.

3. The combination of clutch members adapted to engage each other, a gravitating actuator serving upon depression to couple said members together, a shaft deriving rotation from the latter, a movable abutment on said actuator functioned to arrest said shaft by rising thereover while uncoupling the members, and means operable to displace said abutment.

4. The combination of clutch members designed to be brought together, a separate shaft arranged to be rotated thereby, and a movable abutment operating alternately to couple said members and arrest said shaft, said abutment including a gravitating arm leaning toward the shaft from a connection with the clutch members.

5. The combination of clutch members adapted to engage each other, a shaft rotatable through engagement of said members, a gravity brake for said shaft normally tending to urge the members together, and a starter acting to displace said brake so as to lower it to couple the members while momentarily releasing the shaft.

6. The combination of clutch members adapted for engagement one with the other, an element operable thereby, a gravitating arm tending to unite said members, a braking device including a cam connected with said element, a movable abutment between said arm and said cam, and means for displacing said abutment.

7. The combination of members designed to be clutched together, a shaft operated by the clutched members, a gravitating shifter tending to bring one of said members to the other, a displaceable resistance opposing the shifting member in one direction, said resistance serving to arrest said shaft and a buffer adapted to meet the latter-named member in the opposite direction.

8. The combination of clutch members designed to be worked together, a shaft operated thereby, a gravitating shifter tending to slide one of said members toward the other, a displaceable resistance serving to arrest said shaft and checking the action of said shifter, a buffer in the rear of the slidable member, and a resilient impact receiver connected with said buffer.

9. The combination of clutch members adapted to engage each other, a shaft operated by the members when brought together, a spring-pressed shifter tending to unite said members, a displaceable abutment opposing the action of said shifter while arresting said shaft, and a connection between the shifter and said abutment operating to release the former by displacing the latter.

10. The combination of clutch members designed to be joined together, a shaft operated thereby, a shifter operable to unite said members, coacting gravity and resilient instrumentalities tending to operate said shifter, the same including a depressible arm, and a displaceable abutment carried by said arm capable of arresting said shaft and checking the action of said instrumentalities.

11. The combination of clutch members designed to be worked together, an element operable thereby, intermediate shafting between said members and said element, a shifter tending to unite the members, a braking device between said shifter and the shafting, and means for changing the relative position of said device.

12. The combination of clutch members adapted to be joined together, a shaft upon which one of said members can slide toward the other, an element operable by the united members, an intermediate shaft operatively connected with said element, worm gearing interposed between said shaft, a shifter tending to slide the members into engagement, a braking device checking said shifter from the intermediate shaft, and means for changing the position of said device relatively to the shafting of the shifter.

13. The combination of clutch members adapted to engage each other, a gravitating shifter tending to bring said members into engagement, an element operable by the engaged members, an intermediate shaft connected with said element, a cam revolving with said shaft, a braking device acting upon said cam so as to arrest it together with said shifter, and means capable of displacing said device to permit relative movement of the shifter and cam.

14. The combination of clutch members designed to be worked together, a gravitating shifter tending to unite said members, an element operable by the united members, intermediate shafting, a cam on said shafting controlling the revolution thereof, a braking device interposed between said cam and said shifter, operating to arrest the former by raising the latter, and means for displacing said device to liberate the cam and shifter.

15. The combination of clutch members adapted to engage each other, a gravitating arm tending to join said members together, an element operable by the united members, an intermediate shaft, a cam revolving with the latter, a braking device operating to lock said cam and said arm in an inactive position, and means for displacing said device.

16. The combination of clutch members arranged to be moved one toward the other, a gravitating arm tending to join said members together, an element operable by the united members, an intermediate shaft, a cam revolved by the latter, a braking device oscillatable on said arm operating to raise the same and arrest said cam, and means for displacing said device.

17. The combination of clutch members adapted to engage each other, a gravitating arm tending to join said members together, an element operable by the engaged members, a cam geared with said element, a friction device pivotally connected with said arm, means normally maintaining said device in contact with said cam so as to check its movement and that of the arm, and a starter operating momentarily to swing said device off the cam's surface.

18. The combination of clutch members adapted to be worked together, an element operable thereby, a cam shaft geared with said element, a gravitating arm tending to force said members into engagement, a braking device interposed between said cam shaft and said arm, and means for effecting the displacement of said device so as to permit one revolution of the cam shaft, the cam on the latter meanwhile raising the arm and coacting therewith to check its own rotation.

19. The combination of clutch members adapted to be joined together, an element operable by the united members, a gravitating arm tending to force said members into engagement, a braking device carried by said arm, and a cam shaft in gear with said element, the cam on said shaft being functioned to arrest the same and hold the arm raised through contact with said device.

20. The combination of clutch members adapted to engage each other, a gravitating arm tending to force said members together, an element operable by the engaged members, a cam shaft geared with said element in proximity to said arm, a stop on the latter, a friction device in contact with said cam on said shaft and urged thereby against said stop so as to raise the arm, and means for momentarily lifting said device off the surface of the cam.

21. The combination of clutch members designed to be worked together, an element operable thereby, a cam shaft in gear with said element, an arm gravitating toward the cam on said shaft so as to press said members into engagement, a braking device operating to raise said arm by contact with the cam, and means for temporarily displacing said device.

22. The combination of clutch members designed to be worked together, one of said members being slidable to and from the other, an element operable by the united members, a cam shaft geared with said element capable of arresting the same, an arm gravitating toward the cam on said shaft so as to press said members into engagement, a buffer for the receding slidable member, and a displaceable braking device in contact with the cam operating to stop the latter while raising said arm.

23. The combination of clutch members designed to be worked together, one of said members being slidable to and from the other, a resilient buffer in rear of the sliding member, a gravitating arm tending to force the members into engagement, an element operable by the united members, a cam shaft in gear with said element, and a displaceable braking device depending from said arm into contact with said cam shaft, the cam on the latter operating to raise the arm while being arrested by said device.

24. The combination of clutch members designed to be joined together, one of said members being slidable to and from the other, resilient means tending to join the members, an element operable by the latter, a cam shaft geared with said element, an arm gravitating toward the cam on said shaft and adapted to part said members oppositely to said resilient means, and a displaceable braking abutment coacting with the cam in raising said arm.

25. The combination of clutch members adapted to engage each other, a gravitating arm depressible to bring said members together, an element operable by the united members, a cam shaft in gear with said element, an oscillatable braking abutment on said arm normally pressed into engagement with the cam on said shaft, and means for temporarily freeing the cam from said abutment.

26. The combination of clutch members designed to be revolved together, an element operable thereby, a cam shaft geared with said element, an arm functioned to unite said members by gravitation toward the cam on said shaft, an oscillatable braking abutment on said arm, resilient means operating to maintain a contact between the cam and said abutment, and means for oscillating the abutment oppositely to said resilient means.

27. The combination of clutch members designed to be revolved together, a shaft rotated thereby, one of said members being set on a spline in said shaft, a spool extension to the splined member, a buffer fixed to the shaft in rear of said spool, means slidably connecting the spool with said buffer, a gravitating arm operable to unite said members, a cam geared with the shaft in proximity to said arm, and a displaceable abutment adapted to raise the latter through the action of said cam.

28. The combination of clutch members adapted to engage each other, an element operable thereby, a cam geared with said element, an arm functioned to bring said members together by gravitation toward said cam, a stop on said arm, an angular lever, a roller on said lever adapted to force it against said stop through the action of the cam coming into contact with said roller, and means for rocking the lever so as to displace the roller relatively to the stop and the cam's surface.

29. The combination of clutch members adapted to be joined together, an element operable by the united members, a cam in gear with said element, an arm gravitating toward said cam so as to bring said members into engagement, an angular lever pivotally connected to said arm, a roller carried by said lever in position to ride on the cam, and a starter linked to the lever, enabling it to lift the roller from the cam's surface and liberate the arm.

30. The combination of clutch members designed to be revolved together, an element operable thereby, a cam shaft geared with said element, an arm functioned to unite said members by gravitation toward the cam on said shaft, a displaceable braking abutment in contact with the cam operating to raise said arm, an oscillatory shaft, an operative connection between said shaft and said abutment, and a pedal on the shaft tending to return it to normal after oscillation.

31. The combination of clutch members designed to be brought together, a cam-shaft deriving rotation therefrom, and a brake operating alternately to couple said members by gravitation and to arrest said shaft during retrogression while bearing on the cam thereof in its plane of revolution.

32. The combination of clutch members adapted for engagement one with the other, a shaft rotatable thereby, a gravitating arm tending to unite said members, a resilient abutment carried by said arm, a cam on said shaft positioned to encounter said abutment, and means for tensioning the latter prior to its coming into contact with said cam.

In testimony whereof I have signed my name to this specification.

IRVEN H. DEXTER.